(12) United States Patent
Murray et al.

(10) Patent No.: US 6,403,698 B1
(45) Date of Patent: Jun. 11, 2002

(54) POLYAMIDE/EMULSION POLYMER BLENDS

(75) Inventors: David Logan Murray, Fall Branch; Allan Scott Jones, Limestone; Wesley R. Hale, Kingsport, all of TN (US); William R. Darnell, Weber City, VA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/517,501

(22) Filed: Mar. 2, 2000

Related U.S. Application Data
(60) Provisional application No. 60/122,715, filed on Mar. 3, 1999.

(51) Int. Cl.[7] .................................................. C08J 3/02
(52) U.S. Cl. ..................... 524/502; 524/602; 524/607; 526/317.1; 526/318; 526/318.1
(58) Field of Search ................................. 524/502, 602, 524/607; 526/317.1, 318, 318.1

(56) References Cited

U.S. PATENT DOCUMENTS

| | | |
|---|---|---|
| 2,891,920 A | 6/1959 | Hyde et al. |
| 3,294,725 A | 12/1966 | Findlay et al. |
| 3,384,653 A | 5/1968 | Erner et al. |
| 3,394,164 A | 7/1968 | McClellan et al. |
| 3,642,964 A | 2/1972 | Rausch, Jr. et al. |
| 3,644,457 A | 2/1972 | König et al. |
| 3,779,969 A | 12/1973 | Slagel et al. |
| 3,883,571 A | 5/1975 | Allport et al. |
| 3,985,703 A | 10/1976 | Ferry et al. |
| 4,031,026 A | 6/1977 | Ibbotson |
| 4,115,429 A | 9/1978 | Reiff et al. |
| 4,118,411 A | 10/1978 | Reiff et al. |
| 4,163,002 A | 7/1979 | Pohl et al. |
| 4,177,177 A | 12/1979 | Vanderhoff et al. |
| 4,180,494 A | 12/1979 | Fromuth et al. |
| 4,202,957 A | 5/1980 | Bonk et al. |
| 4,204,049 A | 5/1980 | Matthies et al. |
| 4,259,478 A | 3/1981 | Jackson, Jr. et al. |
| 4,366,306 A | 12/1982 | Smith |
| 4,370,160 A | 1/1983 | Ziemelis |
| 4,376,834 A | 3/1983 | Goldwasser et al. |
| 4,393,153 A | 7/1983 | Hepp |
| 4,414,362 A | 11/1983 | Lenke et al. |
| 4,458,050 A | 7/1984 | Heyman |
| 4,474,918 A | 10/1984 | Seymour et al. |
| 4,495,324 A | 1/1985 | Chacko et al. |
| 4,567,236 A | 1/1986 | Goldwasser et al. |
| 4,568,616 A | 2/1986 | Seifried et al. |
| 4,578,437 A | 3/1986 | Light et al. |
| 4,618,642 A | 10/1986 | Schoenherr |
| 4,675,372 A | 6/1987 | Policastro |
| 4,708,986 A | * 11/1987 | Gerth et al. ................. 525/177 |
| 4,788,001 A | 11/1988 | Narula |
| 4,810,763 A | 3/1989 | Mallya et al. |
| 4,885,350 A | 12/1989 | Yamashita et al. |
| 4,904,733 A | 2/1990 | Gerth et al. |
| 4,954,565 A | 9/1990 | Liles |
| 4,977,213 A | 12/1990 | Giroud-Abel et al. |
| 5,061,766 A | 10/1991 | Yamashita et al. |
| 5,189,107 A | 2/1993 | Kasai et al. |
| 5,250,621 A | 10/1993 | Lütjens et al. |
| 5,270,380 A | 12/1993 | Adamson et al. |
| 5,300,555 A | 4/1994 | Weih et al. |

(List continued on next page.)

FOREIGN PATENT DOCUMENTS

| | | |
|---|---|---|
| CA | 2019716 | 1/1991 |
| EP | 0232694 | 8/1987 |
| EP | 0232695 | 8/1987 |
| EP | 0255137 | 2/1988 |
| EP | 317057 | 5/1989 |
| EP | 0365234 | 4/1990 |
| EP | 377447 | 7/1990 |
| EP | 0377533 | 7/1990 |
| EP | 0407834 | 1/1991 |
| EP | 0440970 | 8/1991 |
| EP | 0517171 | 12/1992 |
| EP | 0581224 | 2/1994 |
| EP | 0752448 | 1/1997 |
| JP | 54157157 | 12/1979 |
| JP | 60040182 | 3/1985 |
| JP | 63186703 | 8/1988 |
| JP | 64001786 | 1/1989 |
| JP | 1123854 | 5/1989 |
| JP | 1163254 | 6/1989 |
| JP | 2016145 | 1/1990 |
| JP | 2024346 | 1/1990 |
| JP | 2155944 | 6/1990 |

(List continued on next page.)

OTHER PUBLICATIONS

Majumdar et al., "Effect of Extruder Type on the Properties and Morphology of Reactive Blends Based on Polyamides," *Journal of Applied Polymer Science,* 54, 339–354 (1994).

Flexman, E.A., "Toughened Semicrystalline Engineering Polymers: Morphology, Impact Resistance and Fracture Mechanisms," *Toughend Plastics I,* 79–104 (1993).

Hobbs et al., "Toughened Nylon Resins," *Polymer Engineering and Science,* vol. 23, 7, 380–389 (1993).

*Primary Examiner*—David W. Wu
*Assistant Examiner*—William K Cheung
(74) *Attorney, Agent, or Firm*—Michael K. Carrier, Esq.; Bernard J. Graves, Jr. Esq.

(57) ABSTRACT

The invention provides a method of making an amide-type polymer/first polymer blend comprising the steps of: a) preparing a polymer colloid system comprising a first polymer dispersed in a liquid continuous phase; b) introducing the polymer colloid system into an amide-type polymerization reaction medium prior to or during the reaction, wherein the reaction medium comprises 1) a diacid component and a diamine component, an oligomer of a diacid and a diamine component, or a mixture thereof; and c) polymerizing the components of b)1, thereby providing an amide-type polymer/first polymer blend. Polymer blends made by the methods herein are also provided.

16 Claims, No Drawings

| U.S. PATENT DOCUMENTS | | | | FOREIGN PATENT DOCUMENTS | | |
|---|---|---|---|---|---|---|
| 5,344,675 A | 9/1994 | Snyder | | JP | 4175370 | 6/1992 |
| 5,349,029 A | 9/1994 | Nam | | JP | 04335002 | 11/1992 |
| 5,358,981 A | 10/1994 | Southwick | | JP | 06184217 | 7/1994 |
| 5,409,967 A | 4/1995 | Carson et al. | | KR | 9503803 | 4/1995 |
| 5,559,159 A | 9/1996 | Sublett et al. | | WO | WO 89/03860 | 5/1989 |
| 5,594,059 A | 1/1997 | Mason et al. | | WO | WO 94/01482 | 1/1994 |
| 5,612,407 A | 3/1997 | Southwick | | WO | WO 95/22570 | 8/1995 |
| 5,652,306 A | 7/1997 | Meyer et al. | | WO | WO 96/30428 | 10/1996 |
| 5,674,937 A | 10/1997 | Berg et al. | | WO | WO 98/02479 | 1/1998 |
| 5,677,366 A | 10/1997 | Wu | | | | |
| 5,891,950 A | 4/1999 | Collins et al. | | * cited by examiner | | |

POLYAMIDE/EMULSION POLYMER BLENDS

CROSS-REFERENCE TO RELATED APPLICATIONS

This application claims priority to U.S. Provisional Application Ser. No. 60/122,715, filed Mar. 3, 1999, the disclosure of which is incorporated herein by this reference in its entirety.

FIELD OF THE INVENTION

The present invention relates to amide-type polymers, for example polyamide and polyesteramide polymers, and methods for making such polymers. The amide-type polymers are produced by introducing a polymer colloid system using a diol and/or water based polymer colloid system into an amide-type polymerization reaction. The polymer colloid system may comprise a water component, a diol component, or a mixture thereof, and optionally, one or more co-solvents. An amide-type polymer/first polymer blend is also provided. The amide-type polymers produced according to the methods of the invention are heterophase materials.

BACKGROUND OF THE INVENTION

Latex polymers are utilized in a variety of products due to the unique features of the polymer delivery system. Latex polymers, by nature, have lower viscosities than their solution counterparts. This lower viscosity allows for higher polymer concentrations to be delivered in an application without encountering the numerous problems associated with high viscosity fluids. The reason for the unique viscosity behavior of latex polymers results from the heterogeneity of the system. The fact that the latex polymers are dispersed, rather than dissolved, in a continuous low viscosity media reduces the influence of the latex polymer on the viscosity of the medium. Therefore, the continuous phase or solvent of the latex is the dominant component affecting the viscosity of the system.

Typically, the continuous phase of most commercial latexes is water. This is beneficial in that water has low toxicity and is not flammable. Water is a good choice when the continuous phase is to be used as a delivery system for the polymer. In some circumstances, however, water may be detrimental to the substrate, or it may be necessary to change the drying characteristics of the latex.

Solvents other than water may be used in the continuous phase. For example, the addition of diol solvents in minor amounts is known. Japanese Patent No. 04335002 discloses the addition of alcohol(s) as an antifreeze agent for the production of vinyl ester emulsions at low temperatures. The amount of the diol solvent disclosed is below 50 wt. %. Japanese Patent No. 63186703 discloses the addition of film forming agents and plasticizers in an amount up to 10 wt % of the solid component to effect film formation properties of the resulting emulsion. Japanese Patent No. 06184217 discloses the addition of polyols and water-soluble inorganic salts to vinyl chloride suspension polymerization reactions to produce vinyl chloride polymers that have good powder fluidity. EP 255137 discloses the use of water soluble alcohol in a water/alcohol level of 100/0 to 50/50 for producing polyvinylester with a high degree of polymerization.

U.S. Pat. No. 3,779,969 describes the use of propylene diol or diethylene diol in amounts of 10–50 wt. % of the emulsion. The ethylene diol is added to impart improved wetting properties of the emulsion.

U.S. Pat. No. 4,458,050 describes a process for the manufacturing of polymer dispersions in diol chain extenders. The patent relates to the production of polymers which have low viscosity for the preparation of polyurethanes. The '050 patent does not disclose compositions which lead to stabilized latexes in diol solvents. The patent also discloses large amounts of polymeric stabilizers to produce the dispersion polymer. Japanese Patent Nos. 60040182 and 64001786 disclose compositions for wateroil repellency for fabric treatment. The compositions are aimed at producing fluoropolymer emulsions in a mixture of diol solvents. Such fluoropolymers are not the subject of this invention.

U.S. Pat. No. 4,810,763 discloses suspension polymerization in an organic medium for the preparation of pressure sensitive adhesives. The compositions described in the '763 patent are specifically aimed at producing large particle size dispersions. This patent does not disclose compositions which produce particle size latexes having a particle size below 1000 nm. This reference also does not disclose emulsion polymerization.

U.S. Pat. No. 4,885,350 and U.S. Pat. No. 5,061,766 disclose the dispersion polymerization of vinyl monomers in hydrophilic organic liquids. To produce the dispersion polymer, large amounts of polymeric dispersion stabilizers are disclosed.

It is known to modify polyamide polymers by blending the polyamide polymer with another polymer in an extruder. To improve the impact properties of a polyamide, a low Tg elastomer is typically added to the polymer in a twin-screw extruder. For example, *Polymer Engineering and Science*, Vol. 23, 7, Page 380 (1983) discloses the use of maleated LDPE blended into nylon 6,6 in a torque rheometer. The effects of polyamide blend component properties and final blend morphology on properties are shown in *Adv. Chem. Ser.* (1993), 233 (Toughened Plastics 1), 70–104. The use of epoxy, carboxylic acid, and imide functionality in polyamide/core-shell rubber blends is disclosed in Japanese Patent No. 04175370. Using anhydride and epoxy functionality in polyamide blends with rubbery ethylene copolymers is disclosed in WO 9522570. The size of the dispersed phase is critical in attaining good properties as taught in *J. Appl. Polym. Sci.* (1994), 54(3), pg 339–54. However, these previously disclosed methods of modifying polyamide polymers each require a separate blending step. Such blending processes are energy intensive, sometimes resulting in the reduction of the physical properties of the polymer, in particular the molecular weight, and it requires a blending step, which utilizes more resources and more time.

There exists a need for a process for producing a polymer blend by more economical methods. Such a need has been solved by the present invention, which can achieve such a blend in a polymerization reactor, wherein the physical properties of the polyamide polymer are maintained or improved.

SUMMARY OF THE INVENTION

In one aspect, the invention herein provides a method of making an amide-type polymer/first polymer blend comprising the steps of:

a. preparing a polymer colloid system comprising a first polymer dispersed in a liquid continuous phase;

b. introducing the polymer colloid system into an amide-type polymerization reaction medium prior to or during the reaction, wherein the reaction medium comprises 1)

a diacid component and a diamine component, an oligomer of a diacid and a diamine component, or a mixture thereof; and c. polymerizing the components of b)1, thereby providing an amide-type polymer/first polymer blend.

In a further aspect, the invention provides an amide-type polymer/first polymer blend comprising:

a. a polymer colloid system comprising a first polymer comprising a non-core shell polymer; and b. an amide polymer.

In yet a further aspect, the invention provides a method of making a amide-type polymer/first polymer blend comprising the steps of:

a. preparing a polymer colloid system comprising a liquid continuous phase;

b. introducing the polymer colloid system into an amide-type polymer; and c. extruding the polymer colloid system and the amide-type polymer, thereby providing an amide-type polymer/first polymer blend.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims that follow, reference will be made to a number of terms which shall be defined to have the following meanings:

The singular forms "a," "an" and "the" include plural referents unless the context clearly dictates otherwise.

"Optional" or "optionally" means that the subsequently described event or circumstances may or may not occur, and that the description included instances where said event or circumstance occurs and instances where it does not.

"Latex" is herein defined as a dispersion of polymeric particles in a continuous phase, the polymeric particles preferably having a size range of from about 10 to 1000 nm. The polymeric particles are preferably produced through emulsion polymerization. "Latex particle" is herein defined as such a polymeric particle, which is preferably dispersed in a continuous phase.

As used herein, the term "latex polymer compositions" include latex comprised of both core shell and non-core shell latex polymers.

"Diol" is a synonym for glycol or dihydric alcohol. "Polyol" is a polyhydric alcohol containing three or more hydroxyl groups.

Ranges are often expressed herein as from about one particular value, and/or to about another particular value. When such a range is expressed, it is to be understood that another embodiment is from the one particular value and/or to the other particular value. Similarly, when values are expressed as approximations, by use of the antecedent "about," it will be understood that the particular value is another embodiment.

Throughout this application, where publications are referenced, the disclosures of these publications in their entireties are hereby incorporated by reference into this application in order to more fully describe the state of the art to which this invention pertains.

In one aspect, the invention herein provides a method of making an amide-type polymer/first polymer blend comprising the steps of:

a. preparing a polymer colloid system comprising a first polymer dispersed in a liquid continuous phase;

b. introducing the polymer colloid system into an arnide-type polymerization reaction medium prior to or during the reaction, wherein the reaction medium comprises 1) a diacid component and a diamine component, an oligomer of a diacid and a diamine component, or a mixture thereof; and c. polymerizing the components of b)1, thereby providing an amide-type polymer/first polymer blend.

In a further aspect, the invention provides an amide-type polymer/first polymer blend comprising:

a. a polymer colloid system comprising a first polymer comprising a non-core shell polymer; and b. an amide polymer.

In yet a further aspect, the invention provides a method of making a amide-type polymer/first polymer blend comprising the steps of:

a. preparing a polymer colloid system comprising a liquid continuous phase;

b. introducing the polymer colloid system into an amide-type polymer; and c. extruding the polymer colloid system and the amide-type polymer, thereby providing an amide-type polymer/first polymer blend.

The invention herein relates to the introduction of polymer colloid system into an amide-type polymerization reaction. The polymer colloid systems may comprise a water component, a diol component, a polyol component and, optionally, one or more cosolvents.

I. The Polymer Colloid System

As mentioned, this invention relates to amide-type polymers, such as modified polyamide polymers, for example nylon 6,6 or nylon 6,10, or modified polyesteramide polymers. Such amide-type polymers are modified by adding a polymer colloid system comprising a first polymer directly into an amide-type polymerization reaction. By adding the polymer colloid system directly into the polymerization reaction, the first polymer will become incorporated into the amide-type polymer to provide a modified amide-type polymer.

The polymer colloid system preferably comprises a liquid continuous phase. In a preferred embodiment, the liquid continuous phase comprises water. In a further preferred embodiment, the liquid continuous phase comprises diol. In a still further preferred embodiment, the liquid continuous phase comprises a mixture of water and diol.

Diol components that may be utilized in the liquid continuous phase of the diol latex compositions include, but are not limited to, any aliphatic or cycloaliphatic diol having from about 2 to about 10 carbon atoms. or a mixture thereof. Preferred diols include ethylene diol, 1,3-trimethylene diol, propylene diol, tripropylene diol, 1,4-butanediol, 1,5-pentanediol, 1,6-hexanediol, 1,7-heptanediol, 1,8-octanediol, 1,9-nonanediol, neopentyl diol, cis- or trans-cyclohexanedimethanol, cis- or trans-2,2,4,4-tetramethyl-1,3-cyclobutanediol, diethylene diol, 2,2,4-trimethyl-1,3-pentanediol, 2-methyl-1,3-propanediol, 2-methyl-1,3- pentanediol, or a mixture thereof; more preferred diols include ethylene diol, propylene diol, tripropylene diol, 1,4-butanediol, diethylene diol, neopentyl diol, cis and trans-cyclohexanedimethanol, or a mixture thereof; even more preferred diols include neopentyl diol, ethylene diol, cis or trans cyclohexanedimethanol, 1,4 butanediol, or a mixture thereof.

The liquid continuous phase may also comprise a polyol component. Representative polyol components that may be used in the continuous phase include, but are not limited to, glycerol, trimethylolpropane, pentaerythritol, 1,2,6-hexanetriol, sorbitol, 1,1,4,4-tetrakis(hydroxymethyl)cyclohexane, tris-(2,hydroxyethyl)isocyanurate, dipentaerythritol, or a mixture thereof. In addition to polyols, higher molecular weight polyols (MW 400–3000), preferably triols derived by condensing alkylene oxides having from 2 to 3 carbons, e.g., ethylene oxide or propylene oxide, with polyol initiators, having from 3 to 6 carbons, e.g., glycerol, can also be used.

The liquid continuous phase may also comprise mixtures of diol, water and/or polyol.

The continuous phase may also comprise a cosolvent. These cosolvents include, but are not limited to methanol, ethanol, propanol, n-butanol, or a mixture thereof. The cosolvent may be present in the amount of less than about 60% by weight, more preferably less than about 40% by weight, based on the total weight of the continuous phase.

As used throughout, the total weight of the continuous phase includes the weight of the diol component, water component, polyol component, and any co-solvent. The weight of any surfactant is not included in the total weight of the continuous phase.

The diol component preferably comprises about 10 to about 100% by weight of the continuous phase, further preferably, from about 20 to about 100% by weight of the continuous phase, still preferably, from about 30 to about 100% by weight of the continuous phase, further preferably, from about 40 to about 100% by weight of the continuous phase, still preferably about 50 to about 100% by weight of the continuous phase. In further embodiments, the diol component preferably comprises from about 60 to about 100% by weight of the continuous phase, more preferably from about 70 to about 100% by weight of the continuous phase; still preferably from about 80 to about 100% by weight of the continuous phase, and, even more preferably, from about 90 to about 100% by weight of the continuous phase. In a particularly preferred embodiment, the continuous phase consists essentially of the diol component. In one embodiment, the diol component consists essentially of tripropylene glycol, 1,4-butanediol, neopentyl glycol, cyclohexanedimethanol, or a mixture thereof.

In a preferred embodiment, the polymer colloid system comprises a latex polymer composition. The diol latex compositions of this invention are prepared by emulsion polymerization. The solids content of the reaction is preferably from about 5 to about 60% by weight but more preferably from about 20 to about 50% by weight. The particle size of the latex polymer particles of the diol latex composition is preferably below about 1000 nm; more preferably from about 20 to about 700 nm, even more preferably, from about 60 to about 250 nm. The temperature of the reaction is preferably from about 0 to about 190° C., more preferably from about 60 to about 90° C.

A surfactant is preferably used to prepare the latex polymer compositions. One of skill in the art would recognize that the type and amount of surfactant used in the emulsion polymerization depends on the monomer combinations and the polymerization conditions. Surfactants used in the emulsion polymerization may be anionic, cationic, or nonionic surfactants. Anionic surfactants that may be used in the invention include surfactants such as alkali metal or ammonium salts of alkyl, aryl or alkylaryl sulfonates, sulfates, phosphates, or a mixture thereof. Suitable nonionic surfactants include, but are not limited to, alkyl and alkylaryl polydiol ethers, such as ethoxylation products of lauryl, oleyl and stearyl alcohols; alkyl phenol glycol ethers, including but not limited to, ethoxylation products of octyl or nonylphenol. Suitable surfactants may be found in *McCutcheon's Volume I: Emulsifiers and Detergents* 1996 *North American Edition*, MC Publishing Co., Glen Rock, N.J., 1996. The surfactant may or may not be reactive in the emulsion polymerization. In one embodiment, useful surfactants are the sulfate/sulfonate salts of nonyl phenol and alkyl alcohol ethoxylates. Preferred surfactants include, but are not limited to, polymerizable or nonpolymerizable alkyl ethoxylate sulfates, alkyl phenol ethoxylate sulfates, alkyl ethoxylates, alkyl phenol ethoxylates, or a mixture thereof.

The polymer colloid systems may be prepared by any conventional means known in the art. When the polymer colloid systems comprise latex polymers, the monomers that are used to form the latex polymers may be broadly characterized as ethylenically unsaturated monomers. These include, but are not limited to, non-acid vinyl monomers, acid vinyl monomers, or a mixture thereof. The latex polymers may be copolymers of non-acid vinyl monomers and acid monomers, or a mixture thereof and their derivatives. The latex polymers of the invention may also be homopolymers of ethylenically unsaturated monomers.

Suitable non-acid vinyl monomers that may be used to prepare the latex polymer colloid systems include, but are not limited to, acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, styrene, α-methyl styrene, glycidyl methacrylate, carbodiimide methacrylate, C1–C18 alkyl crotonates, di-n-butyl maleate, α or β-vinyl naphthalene, di-octylmaleate, allyl methacrylate, di-allyl maleate, di-allylmalonate, methyoxybutenyl methacrylate, isobomyl methacrylate, hydroxybutenyl methacrylate, hydroxyethyl (meth)acrylate, hydroxypropyl(meth)acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, and 3,4-di-acetoxy-1-butene, or a mixture thereof. Suitable monomers are described in *The Brandon Associates*, 2nd edition, 1992 Merrimack, N.H., and in *Polymers and Monomers*, the 1996–1997 Catalog from Polyscience, Inc., Warrington, Pa., U.S.A.

Acid vinyl monomers that may be used to prepare the latex polymer colloid systems include, but are not limited to, acrylic acid, methacrylic acid, itaconic acid, crotonic acid, monovinyl adipate, or a mixture thereof.

Preferred monomers useful for making the latex polymer/(co)polymer are preferably ethylenically unsaturated monomers including, but not limited to, acrylates, methacrylates, vinylesters, styrene, styrene derivatives such as 4-sodiosulfostyrene, vinyl chloride, vinylidene chloride, acrylonitrile, isoprene, butadiene, or a mixture thereof. In a more preferred embodiment, the latex polymer comprises (co)polymers of 2-ethyl-hexyl acrylate, styrene, butylacrylate, butylmethacrylate, ethylacrylate, methylmethacrylate, butadiene, isoprene, or a mixture thereof.

In a preferred embodiment, the molecular weight of the latex polymer is a weight average molecular weight (Mw) of from about 1,000 to about 1,000,000 as determined by gel permeation chromatography (GPC), more preferably a weight average molecular weight of from 5000 to 250,000. In one embodiment, the glass transition temperature (Tg) of the latex polymer is less than or equal to about 170° C.

The diol latex compositions of this invention may be characterized as stabilized latexes in a continuous phase comprising a diol component. A stable latex is defined for the purposes of this invention as one in which the particles are colloidally stable, i.e., the latex particles remain dispersed in the continuous phase for long periods of time, such as about 24 hours, preferably about 48 hours, even more preferably, one week.

The latex polymer particles generally have a spherical shape. As noted previously, the latex polymer utilized in the compositions of the present invention may be a core shell polymer or a non core shell polymer. When a core shell polymer is utilized, the polymers may be prepared in a core/shell fashion by staging the monomer addition. For example, the composition of the monomer feed of the polymerization may be changed over the course of the reaction in an abrupt fashion, resulting in a distinct core and shell portion of the polymer. The core/shell polymer particles may also be prepared in a multilobe form, a peanut shell form, an acorn form, or a raspberry form. That in such particles, the core portion can comprise from about 20 to about 80% of the total weight of said particle and the shell portion can comprise from about 80 to about 20% of the total weight volume of the particle.

In one embodiment, chain transfer agents are used in the emulsion polymerization. Typical chain transfer agents are those known in the art. Chain transfer agents that may be used in the emulsion polymerization reaction to form the latex compositions include, but are not limited to, butyl mercaptan, dodecyl mercaptan, mercaptopropionic acid, 2-ethylhexyl-3-mercaptopropionate, n-butyl-3-mercaptopropionate, octyl mercaptan, isodecyl mercaptan, octadecyl mercaptan, mercaptoacetate, allyl mercaptopropionate, allyl mercaptoacetate, crotyl mercaptoproprionate, crotyl mercaptoacetate, and the reactive chain transfer agents disclosed or described in U.S. Pat. No. 5,247,040, which is incorporated herein by this reference. Preferably, the chain transfer agent is selected from the mercaptans and various alkyl halides, including, but not limited to, carbon tetrachloride; more preferably the chain transfer agent is 2-ethylhexyl-3-mercaptopropionate. Chain transfer agents can be added in amounts from 0 to 2 parts per hundred monomer (phm), more preferably 0 to 0.5 phm.

The polymer colloid systems of the invention may preferably include latex polymers that can be uncrosslinked or crosslinked.

In a preferred embodiment, the latexes are crosslinked utilizing suitable crosslinking agents which include multifunctional unsaturated compounds including, but not limited to, divinyl benzene, allyl methacrylate, allyl acrylate, multifunctional acrylates, or a mixture thereof. Suitable multifunctional acrylates include, but are not limited to, ethylene diol dimethacrylate, ethylene diol diacrylate, trimethylolpropane triacrylate, trimethylolpropane trimethacrylate, pentaerythritoltetraacrylate, or a mixture thereof. The amount of the crosslinking monomer in the emulsion polymerization can be controlled to vary the gel fraction of the latex from about 20 to about 100 percent. The gel fraction is the amount that will not dissolve in a good solvent.

In a further preferred embodiment, the polymer colloid system is comprised of a first polymer which is uncrosslinked. It is particularly preferred that the first polymer is an uncrosslinked latex. One of ordinary skill in the art will recognize that uncrosslinked polymers, such as latexes, may be prepared from the same monomers and continuous phases as are utilized to prepare the crosslinked polymer colloid systems, with the exception that a crosslinking agent is not utilized.

The latex particles may be functionalized by including monomers with pendent functional groups. Functional groups that may be incorporated in the latex particle include, but are not limited to, epoxy groups, acetoacetoxy, carbonate groups, hydroxyl groups amine groups, isocyanate groups, amide groups, or a mixture thereof. The functional groups may be derived from a variety of monomers, including, but not limited to, glycidyl methacrylate, acetoacetoxy ethyl methacrylate, vinyl ethylene carbonate, hydroxyl ethyl methacrylate, t-butylaminoethyl methacrylate, dimethylamino methacrylate, m-isopropenyl-alpha,alpha-dimethylbenzyl isocyanate, acrylamide and n-methylolacrylamide. The addition of functional groups allows for further reaction of the polymer after latex synthesis. The functionality may be useful to impart latent crosslinking or it may be used to react with polyamide polymers as discussed in Section II, below.

Initiators can be used in the emulsion polymerization to form the latex compositions, which include, but are not limited to, salts of persulfates, water or diol soluble organic peroxides and azo type initiators. Preferred initiators include, but are not limited to hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, or a mixture thereof Redox initiation systems (Reduction Oxidation Initiation) such as iron catalyzed reaction of t-butyl hydroperoxide with isoascorbic acid are also useful. It is preferable not to use initiators capable of generating a strong acid as a by-product. This avoids possible side reactions of the diol component of the solvent with the acid. Initiators can be added in amounts from about 0.1 to about 2 phm, more preferably from about 0.3 to about 0.8 phm.

Reducing agents may also be used in the emulsion polymerization. Suitable reducing agents are those that increase the rate of polymerization and include, for example, sodium bisulfite, sodium hydrosulfite, sodium formaldehyde sulfoxylate, ascorbic acid, isoascorbic acid, or a mixture thereof. If a reducing agent is introduced into the emulsion polymerization, it is preferably added in an amount of about 0.1 to about 2 phm, more preferably about 0.3 to about 0.8 phm. It is preferable to feed the reducing agent into the reactor over time.

Buffering agents may also be used in the emulsion polymerization to control the pH of the reaction. Suitable buffering agents include, but are not limited to, ammonium and sodium salts of carbonates and bicarbonates. It is preferred that the buffering agents be included when using acid generating initiators, including, but not limited to, the salts of persulfates.

Polymerization catalysts may also be used in the emulsion polymerization. Polymerization catalysts are those compounds that increase the rate of polymerization and which, in combination with the above-described reducing agents, may promote decomposition of the polymerization initiator under the reaction conditions. Suitable catalysts include, but are not limited to, transition metal compounds such as, for example, ferrous sulfate heptahydrate, ferrous chloride, cupric sulfate, cupric chloride, cobalt acetate, cobaltous sulfate, or a mixture thereof.

The latex compositions are prepared by first forming an emulsion or solution comprising monomers, an initiator, a surfactant and a continuous phase. In one embodiment, the continuous phase comprises up to about 100% by weight of water, diol, polyol, or a mixture thereof. The mixture is then heated which causes the monomer to polymerize and form the latex polymers. Typically, the monomer is fed into the reactor over a period of time and a separate initiator feed is also fed into the reactor over time.

The latex compositions may contain a stabilizer or a stabilizer does not have to be present. Stabilizers suitable for use in the latex composition include, but are not limited to an anionic stabilizer, a nonionic suspension stabilizer, an amphoteric suspension stabilizer or a mixture thereof. The suspension stabilizer must be soluble in the continuous phase, but substantially insoluble with the monomers. If present, the concentration of the suspension stabilizer is from about 3 to about 15% by weight of the monomers; preferably from about 7 to about 8% by weight of the monomers.

When diol is utilized, diol concentration in the continuous phase may approach about 100%, the wetting properties of the diol latex composition for hydrophobic surfaces improve, and the diol latex compositions are less volatile. The reduced volatility of the diol latex composition is especially advantageous when the diol latex composition when utilized in an amide-type polymerization as disclosed in Section II, below.

The latex compositions of the invention and may further contain water, a solvent, a pigment (organic or inorganic) and/or other additives or fillers known in the art. Such additives or fillers, include, but are not limited to, leveling, rheology, and flow control agents such as silicones, fluorocarbons, urethanes, or cellulosics, extenders, reactive coalescing aids such as those described in U.S. Pat. No. 5,349,026, flatting agents, pigment wetting and dispersing agents and surfactants, ultraviolet absorbers, ultraviolet light stabilizers, tinting pigments, extenders, defoaming and antifoaming agents, anti-settling, anti-sag and bodying agents, anti-skinning agents, anti-flooding and anti-floating agents, fungicides and mildewcides, corrosion inhibitors, thickening agents, plasticizers, reactive plasticizers, curing agents or coalescing agents. Specific examples of such additives can be found in *Raw Materials Index*, published by the National Paint & Coatings Association, 1500 Rhode Island Avenue, NW, Washington, D.C. 20005, U.S.A.

II. Amide-Type Polymer Blend

In a major embodiment, the invention relates to the introduction of a polymer colloid system into a reaction that forms an amide-type polymer, resulting in a product having polymer particles incorporated into an amide-type polymer blend. The polymer colloid system that is introduced into the polymerization reaction is herein defined as polymer particles dispersed in a continuous phase, the polymer particles preferably having a particle size in the range of from about 0.020 microns to about 1000 microns. The continuous phase may contain small amounts of unreacted monomer, surfactant, etc.

In one embodiment, the polymer particles suitable for use in the polymer colloid system, which are herein defined as the first polymer, comprise the same polymers made from the same ethylenically unsaturated monomers as those described in connection with the latex compositions described in Section I above, and may be functionalized, crosslinked or uncrosslinked in the same manner as that disclosed for the latex polymers of Section I. If functionalized, it is preferred that the functional groups include groups capable of reacting with an acid, amine, amide or ester. These functional groups include, but are not limited to, epoxy, acid, hydroxyl, isocyanate, amine, amide, and carbonate groups, or a mixture thereof. In addition, the first polymer may be a core-shell or non core-shell polymer.

The polymer colloid system may be prepared by a variety of methods, including, but not limited to, emulsion, suspension, dispersion polymerization and mechanical emulsification. In general, dispersion and suspension polymerization produce larger particle sizes, typically in the range of about 1 to about 500 microns, while emulsion polymerization produces particles of smaller sizes, typically in the range of about 10 to about 1000 nanometers. As used hereinbelow, the first polymer of the polymer colloid system of the present invention includes both core shell and non-core shell type latex polymers.

In a preferred embodiment, the first polymer is a non core-shell polymer, and the first polymer of the polymer colloid system comprises from about 50 to about 100%, preferably about 70 to about 100%, even more preferably from about 80 to about 100% of the residues of one of the following monomers: 2-ethyl hexyl acrylate, butyl acrylate, butadiene, isoprene, acrylonitrile, styrene, or a mixture thereof.

In a preferred embodiment, the first polymer is a core-shell polymer, and the first polymer of the polymer colloid system comprises from about 50 to about 100%, preferably about 70 to about 100%, even more preferably from about 80 to about 100% of the residues of one of the following monomers: 2-ethyl hexyl acrylate, butyl acrylate, butadiene, isoprene, acrylonitrile, styrene, or a mixture thereof.

Emulsion, suspension, dispersion and mechanical emulsification polymerization are known techniques of forming polymer colloid systems. If dispersion polymerization is selected to prepare the polymer colloid system that is introduced into the polyamide polymerization reaction, processes similar to those described in U.S. Pat. Nos. 4,885,350 and 5,061,766 may be used to prepare polymer colloid systems having a particle size range of about 1 micron to about 100 microns. If mechanical emulsification is used, processes similar to those described in U.S. Pat. Nos. 4,177,177, 5,358,981 and 5,612,407 may be used.

For either the suspension, dispersion or mechanically emulsified polymerized polymer colloid system, formed as a precursor to be introduced into the amide-type polymerization reaction, the solvent or continuous phase may comprise water, a diol, a polyol, or a mixture thereof. Further, the continuous phase of each polymer colloid system may consist essentially of or consist of water, a diol or polyol, or may comprise any proportion of either component.

The latex polymer that is introduced into the polymerization reaction in one embodiment of the invention herein is defined as crosslinked or uncrosslinked polymer particles dispersed in a continuous phase, the polymer particles preferably having a particle size in the range of from about 0.020 microns to about 1000 microns. The continuous phase may contain small amounts of unreacted monomer, surfactant, etc.

One of ordinary skill in the art will recognize that the resulting blends will have particular characteristics that are, in part, related to whether the first polymer of the polymer of the polymer colloid system is crosslinked or uncrosslinked.

In the polymer colloid system comprising a diol-based continuous phase, the diols in the continuous phase co-react with ester, acid or amide functionality, or a mixture thereof that comprise the reaction medium which forms the amide-type polymer. In such a co-reaction, a polyesteramide is preferably formed. The diol component preferably comprises about 10 to about 100% by weight of the continuous phase, further preferably, from about 20 to about 100% by weight of the continuous phase, still preferably, from about 30 to about 100% by weight of the continuous phase, further preferably, from about 40 to about 100% by weight of the continuous phase, still preferably about 50 to about 100% by weight of the continuous phase. In further embodiments, the diol component preferably comprises from about 60 to about 100% by weight of the continuous phase, more preferably from about 70 to about 100% by weight of the continuous phase; still preferably from about 80 to about 100% by weight of the continuous phase, and, even more preferably, from about 90 to about 100% by weight of the continuous phase. In a particularly preferred embodiment, the continuous phase consists essentially of the diol component. In one embodiment, the diol component consists essentially of tripropylene glycol, 1,4-butanediol, neopentyl glycol, cyclohexanedimethanol, or a mixture thereof.

The polymer colloid systems of the present invention may also comprise water. In a preferred embodiment, the water comprises from about 10 to about 100% by weight of the continuous phase, further preferably, from about 20% to about 100% by weight of the continuous phase, still preferably about 30 to about 100% by weight of the continuous phase. In further embodiments, the water preferably comprises from about 40 to about 100% by weight of the continuous phase, more preferably from about 50 to about 100% by weight of the continuous phase; still preferably from about 60 to about 100% by weight of the continuous phase, even more preferably from about 70 to about 100% by weight of the continuous phase. Still preferably, the water comprises from about 80 to about 100% by weight of the continuous phase and, further preferably, the water comprises from about 90 to about 100% by weight of the continuous phase. In a further preferred embodiment, the continuous phase of the polymer colloid system consists essentially of water.

The total weight of the continuous phase includes the weight of the water component, diol component, polyol component and any co-solvent. The weight of any surfactant is not included in the total weight of the continuous phase.

In one embodiment, the diol of the polymer colloid system may be present in either the continuous phase, the amide-type reaction medium, or both. The polymer colloid system may be introduced into the polyamide polymerization at various stages. For example, in a nylon 6,6 polymerization of the amide-type polymerization reactions of this invention, the polymer colloid system i.e., latex polymer composition, can be added: 1) "up-front" with the diamine and diacid starting materials; 2) after the diamine and diacid form a homogeneous melt; 3) after the diamine and diacid react for a while to produce oligomeric materials; 4) after considerable amide-type polymer molecular weight buildup; or 5) near the completion of the polymerization reaction. The amide-type polymer blend can also be produced from a pre-reacted nylon salt. The polyamide polymerization can also be conducted starting with an amide-type oligomer or polymer that was previously made.

Alternatively, the polymer colloid system may be blended into the fully or partially formed polyamide-type polymer directly in an extruder at temperatures from about 200 to about 320° C. In this process, since the polymer colloid system is added directly to the amide-type polymer, there is no need to harvest the first polymer from the polymer colloid system. This provides a more economical process over those of the prior art.

As noted, the polymer colloid system can be added at any stage of the reaction. The final blend can be affected by the time the polymer colloid system is added. While not wishing to be bound by any mechanism, it is believed that the properties of the amide-type polymer blend can be affected by the time of the addition of the polymer colloid system. Also, particular chemical interaction between the first polymer of the polymer colloid system and amide-type polymers are affected by time of addition, and they, in consequence, affect final blend properties.

The process of the invention does not require the isolation of the first polymer from the polymer colloid system. Thus, when latex polymers are used, the present invention overcomes the necessity of preparing a core shell polymer or the necessity of harvesting the polymer from the emulsion. Further, since blending takes place during the preparation of the amide-type polymer in the polymerization reactor, there is no need for a polymer/polymer post blending step that is energy intensive, expensive and often leads to the reduction of the molecular weight of the amide-type polymer.

The amount of latex polymer in the amide-type polymer/first polymer blend may comprise a wide range of values. However, it is particularly preferred that the amount of latex polymer in the blend is greater than about 5% by weight of the blend. Still further, it is preferred that the amount of latex polymer in the amide-type polymer/first polymer blend be from greater than about 5 to about 50% by weight of the blend, and, still further preferably, from greater than about 5 to about 25% by weight of the blend.

The term "polyamide," as used herein, refers to any unit-type of polyamide falling within the scope of the polyamide portion of the blend, including, but not limited to, homopolyamides, and copolyamides (two or more types of acid and/or diamine residues of monomeric units). The polyamides of the present invention preferably comprise an acid residue and a diamine residue. The acid residues of the polyamides of the present invention total about 100 mol % and the diamine residues of the polyamides of the present invention total about 100 mol %. It should be understood that use of the corresponding derivatives, specifically acid anhydrides, esters and acid chlorides of these acids is included throughout the application in the term "acid residue." In addition to the acid residue and the diamine residue, the polyamide may comprise other modifying residues. These modifying residues include, but are not limited to, a diol, which would result in a polyesteramide.

When the amide-type polymer utilized in the present invention is a polyamide, the polymer may be aliphatic, partially aromatic or entirely aromatic. Combinations of such polyamides are also included within the scope of the invention. By "partially aromatic polyamide" it is meant that the amide linkage of the partially aromatic polyamide contains at least one aromatic ring and a nonaromatic species.

The polyamides are prepared from a diacid and a diamine. Polyamides are formed from isophthalic acid, terephthalic acid, cyclohexanedicarboxylic acid and meta- or para-xylylene diamine, 1,3- or 1,4-cyclohexane(bis)

methylamine, aliphatic diacids with about 6 to about 12 carbon atoms, aliphatic amino acids or lactams with 6 to 12 carbon atoms, aliphatic diamines with about 4 to about 12 carbon atoms or a mixture thereof. Other generally known polyamide forming diacids and diamines can be used. The polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include: poly(m-xylylene adipamide), poly(hexamethylene isophthalamide), poly(hexamethylene adipamide-co-isophthalamide), poly (hexamethylene adipamide-co-terephthalamide), and poly (hexamethylene isophthalamide-co-terephthalamide), or a mixture thereof.

Preferred aliphatic polyamides include polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6), polydodecamethylene-sebacamide (nylon 12,8), or a mixture thereof.

The amide-type polymers are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally from about 80 to about 120° C., until the ester is converted to an amide. The mixture is then heated to the polymerization temperature.

The molecular weight of the resulting amide-type polymer is controlled by the diacid-diamine ratio. An excess of diamine produces a higher concentration of terminal amino groups. If the diacid-diamine complex is prepared in a separate step, excess diamine is added prior to the polymerization. The polymerization can be carried out either at atmospheric pressure or at elevated pressures.

In a preferred embodiment, the amide-type polymers of the invention herein may be formed from oligomers of a diamine and a diacid. Such oligomers are preferably further reacted in the presence of suitable reactants to provide the amide-type polymers of the present invention.

When a diol is present in the amide-type polymerization reaction, a polyesteramide will result. The same diols utilized in the diol latex compositions discussed above in Section I may be added to the amide-type polymerization reactions. The diol may be present in the polymer colloid system or may be added to the amide-type reaction medium. In a preferred embodiment, ethylene diol and/or butanediol is added to an amide-type reaction medium comprising a nylon 6,6-type oligomer to provide a polyesteramide.

It is preferred that the amide-type polymers of the invention are essentially linear. The amide-type polymers may be modified with low levels of one or more branching agents. A branching agent is herein defined as a molecule that has at least three functional groups that can participate an amide-type polymer forming reaction, such as amino, carboxylic acid, carboxylic ester.

Branching agents useful in preparing the amide-type polymers of the invention include, but are not limited to, glycerol, pentaerythritol, trimellitic anhydride, pyromellitic dianhydride, tartaric acid, or a mixture thereof. If branching agents are used in the amide-type polymer reaction, a preferred range for the branching agent is from about 0.1 to about 2.0 weight %, more preferably from about 0.2 to about 1.0 weight %, based on the total weight of the amide-type polymer.

Addition of branching agents at low levels does not have a significant detrimental effect on the physical properties of the amide-type polymers and provides additional melt strength which can be very useful in film extruding operations. High levels of branching agents incorporated in the co-amide-type polymers results in co-amide-type polymers with poor physical properties, for example low elongation.

In one embodiment of the invention herein, an amide-type polymer/first polymer blend is provided. In a preferred embodiment, a method of making such a material is provided according to the following steps: a) preparing a polymer colloid system comprising a first polymer dispersed in a liquid continuous phase; b) introducing the polymer colloid system into an amide-type polymerization reaction medium comprising 1) a diamine component and a diacid component, an oligomer of a diamine and diacid or a mixture thereof; and c) polymerizing the components of b)1 thereby providing an amide-type polymer/first polymer blend. In a preferred embodiment, the first polymer comprises a latex polymer.

In a particularly preferred embodiment relating to the amide-type polymer of the present invention, the liquid continuous phase of the polymer colloid system comprises a water component substantially in the absence of a diol and/or a polyol to provide an amide-type polymer. In one aspect of this invention, the first polymer of the polymer colloid system is incorporated into the amide-type polymer to provide an amide-type polymer/first polymer blend. In a preferred embodiment, the polymer colloid system comprises a latex polymer composition, thereby providing a polyamide/latex polymer blend.

In a further particularly preferred embodiment relating to the amide-type polymer of the present invention, the liquid continuous phase comprises a diol component to provide a polyesteramide polymer. In one aspect of this embodiment, the first polymer of the polymer colloid system is incorporated into the amide-type polymer to provide an amide-type polymer/first polymer blend. In a preferred embodiment, the polymer colloid system comprises a latex polymer composition, thereby providing a polyesteramide/latex polymer blend.

In a further particularly preferred embodiment relating to the amide-type polymer of the present invention, the liquid continuous phase comprises a mixture of water and diol. In one aspect of this embodiment, the first polymer of the polymer colloid system will be incorporated into the amide-type polymer to provide an amide-type polymer/first polymer blend. In a preferred embodiment, the polymer colloid system comprises a latex polymer composition, thereby providing a polyesteramide/latex polymer blend. One of skill in the art will recognize that by varying the amount of glycol in the polymer colloid system, the number of ester moieties in the polyesteramide can be varied. Accordingly, in various preferred embodiments of the present invention, the diol/water ratio in the liquid continuous phase is varied to provide polyesteramide polymers with differing amounts of ester moieties.

In one aspect, the invention provides an amide-type polymer comprising a latex polymer incorporated into a polyamide or polyesteramide blend. In a further embodiment, the invention provides an amide-type polymer comprising a non-core shell polymer incorporated into a polyamide or polyesteramide blend. In a still further embodiment, the invention provides an amide-type polymer comprising a latex non-core shell latex polymer incorporated into a polyamide or polyesteramide blend. In still a further embodiment, the invention provides an amide-type polymer comprising a core shell polymer incorporated into a polyamide or polyesteramide blend. In yet a further embodiment, the invention provides an amide-type polymer comprising a core shell latex polymer incorporated into a polyamide or polyesteramide blend.

The polymer compositions of this invention may be buffered. Buffers can be utilized to control the formation diethylene glycol, among other uses, in a polyesteramide ester. Preferred buffers include sodium acetate, potassium acetate, lithium acetate, sodium phosphate monobasic, potassium phosphate dibasic and sodium carbonate. Buffering agents are useful to limit the amount of acidic species which, in turn causes dehydration of the diols to give ether diol. Accordingly, it can be desirable to limit such acid species through the use of buffering agents.

The final stage of the reaction is generally conducted under high vacuum (< about 10 mm of Hg) in order to produce a high molecular weight amide-type polymer.

Other ingredients may optionally be added to the compositions of the present invention to enhance the performance properties of the amide-type polymer/first polymer blend. For example, reinforcing agents, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, a mixture thereof, and the like, can be included herein. All of these additives and the use thereof are well known in the art. Any of these compounds can be used so long as they do not hinder the present invention from accomplishing its objects.

In a particularly preferred embodiment relating to the addition of reinforcing agents to the compositions of the present invention, glass fibers may be added to the amide-type polymer compositions to provide particular advantages to the resulting compositions. Glass fibers that are preferred in the present invention conventionally have an average standard diameter of greater than about 5 microns, with a range of from about 1 to about 20 microns. The length of the glass filaments whether or not they are bundled into fibers, and whether the fibers are further bundled into yarns, ropes or rovings, and the like, are not critical to this invention. However, for the purpose of preparing the present compositions, it is preferable to use filamentous glass in the form of chopped strands of from about 1.5 mm to about 10 mm long, and preferably less than about 6 mm long. In the pellets and molded articles of the compositions, even shorter lengths will be encountered, because during compounding, considerable fragmentation occurs. This is, however, desirable because the best properties are exhibited for injection molded articles where the filament lengths are between about 0.03 mm and about 1 mm. Especially preferred are glass fibers having an average standard diameter in the range of greater than about 5 microns, preferably about 5 to about 14 microns, and the average filament length dispersed in the molded articles being between about 0.15 and about 0.4 mm. Consequently, glass filaments are dispersed uniformly and the molded articles exhibit uniform and balanced mechanical properties, especially surface smoothness.

The amount of the glass fibers can vary broadly from about 10 to about 50% by weight, and most preferably about 10 to about 40% by weight, based on the total polymer composition. These glass fibers are typically conventionally sized with coupling agents, such as aminosilanes and epoxysilanes and titanates, and adhesion promoters such as epoxies, urethanes, cellulosics, starch, cyanurates, and the like.

In one embodiment, when the glass fiber is present in the polymer molding composition, the polymer is preferably from about 70 to about 85% by weight of the total composition based on the total weight percentages of the first and second polymers equaling 100%. Preferably, the polymer in the polymer molding composition comprises an amide-type polymer.

Examples of other reinforcing agents that are useful in addition to glass fibers, include, but are not limited to, carbon fibers, mica, clay, talc, wollastonite, calcium carbonate or a combination thereof. The polymer compositions of the invention may be reinforced with a mixture of glass and other reinforcing agents as described above, such as mica or talc, and/or with other additives.

In accordance with the invention herein, the polymer colloid system and glass fibers, as well as other reinforcing agents, may be introduced into the amide-type polymerization reaction at various stages of the process. In a particularly preferred embodiment of the invention herein, the glass fibers are added directly to the amide-type polymerization reaction. Since the glass fibers can be sufficiently blended during this stage, there is no need for a post-blending step, such as extrusion, to incorporate the glass fibers into the compositions. This is particularly advantageous to the present invention because a post-blending step is energy intensive, expensive and may often cause a reduction in the molecular weight of the amide-type polymer.

End-use applications for the compositions of the amide-type polymers produced according to the instant invention include impact-modified polymers, elastomers, high barrier films and coatings, improved barrier polymers, and polymers having improved mechanical properties, such as improved tensile strength, improved elongation at break, better weathering properties, and improved flexural strength. Other end-use applications include engineering resins, coatings, containers for barrier applications and molding plastics. In addition, powder coatings may be produced from the modified amide-type polymers produced according to the invention. The polymers produced by this invention are useful for thermoplastic engineering resins, elastomers, films, sheets and container plastics.

In a preferred embodiment, an impact modified amide-type polymer is prepared comprising a non core shell or core shell first polymer derived from a polymer colloid system. In another preferred embodiment, a hydroxyl functionalized amide-type polymer coating is prepared comprising a non core shell or a core shell first polymer derived from a polymer colloid system.

In one embodiment of the invention, a modified amide-type polymer, including, but not limited to, an impact modified plastic, is produced from a polymer colloid system comprising first polymers which are either core shell polymers or non core shell polymers, and an amide-type polymer. The first polymer of the polymer colloid system utilized in this embodiment preferably has a Tg less than about 40° C., while the amide-type polymer has a Tg greater than about 40° C. In a further embodiment, the amide-type polymer will have a Tg of less than about 40° C. and the first polymer will have a Tg of greater than about 40° C. In a further embodiment, both the amide-type polymer and the first polymer have Tg's of less than about 40° C. The impact modified plastic is preferably prepared from a polymer colloid system comprising a first polymer which comprises residues of 2-ethyl hexyl acrylate, butyl acrylate, isoprene, butadiene, lauryl acrylate, vinylidene chloride, or a mixture thereof.

In another embodiment of the invention, a modified amide-type polymer, including but not limited to, a thermoplastic elastomer is produced from a polymer colloid system comprising first polymers which are either core shell polymers or non core shell polymers. The polymer colloid in this embodiment has a Tg greater than about 40° C., and the amide-type polymer has a Tg less than about 40° C. and preferably has essentially no crystallinity, more preferably, the amide-type polymer will have a Tg of less than about 0° C. and essentially no crystallinity, and, still more preferably, the amide-type polymer will have a Tg of less than about −20° C. and essentially no crystallinity. In a further embodiment, both the amide-type polymer and the first polymer have Tg's of less than about 40° C. The thermoplastic elastomer is preferably prepared from a polymer colloid system comprising a first polymer comprising residues of vinyl chloride, styrene, α-methyl styrene, methyl methacrylate, vinyl naphthalene, isobornyl methacrylate or a mixture thereof.

Elastomers are finding increasing utility, in particular thermoplastic elastomers (TPE's) that are elastomeric at use temperature, but can be processed as a plastic (e.g. injection molding, extruded) at appropriate temperatures. An elastomer may be prepared according to the process of the invention. For example, an amide-type polymer that is amorphous and has a low Tg may be a viscous fluid that is not useful as a plastic or elastomer. This low Tg viscous polymer may be used to make an elastomer by adding a second polymer, in the form of a polymer colloid system, that acts as a physical cross-linker and is a tie-point for the viscous polymer chains. A phase separated polymer blend will result that has elastomeric properties.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

The materials and testing procedures used for the results shown herein are as follows:

Inherent viscosity (Ih. V.) was determined at 25° C. with a 0.50 gram sample in 100 mL of 60/40 by weight solution of phenol/tetrachloroethane.

Molecular weight distributions were determined by gel permeation chromatography (GPC). Solutions were made by dissolving 4 mg of polymer in a 30/70 by weight solution of hexafluoroisopropanol/methylene chloride containing 10% by volume toluene as a flow rate marker. The system was calibrated using a series of narrow molecular weight polystyrene standards. The molecular weights were reported in absolute molecular weight values determined from a set of Mark-Houwink constants that relate PET to polystyrene.

Thermal transitions were determined by differential scanning calorimetry (DSC) on a DuPont instruments 2200 DSC. Percent crystallinity was also determined by DSC. DSC was performed using a scan rate of 20° C./minute after the sample was heated above its melting temperature and rapidly quenched below its glass transition temperature.

Films were prepared by compression molding the dried polymer. Drying was accomplished in a 120° C. vacuum oven (20 mm Hg) overnight. The dried polymers were compression molded at Tm+30 to 50 C into a 6"×6" film by pressing between two metal plates with a 15 mil shim on a Pasadena Hydraulics Inc. press. Pressure was gradually applied for 2 minutes before ultimately reaching 15,000 ram force pounds and holding for 1 minute. After compression molding, the films were quickly dipped into an ice bath to quench. Instrumented impact testing of the films was done according to ASTM method D3763, "High Speed Puncture Properties of Plastics Using Load and Displacement Sensors." Testing was done at 23° C. on a Ceast Fractovic testing machine. Film thickness ranged from 0.33–0.38 mm. Films were placed over a hole with a 76 mm insert diameter while the films were hit with a 0.5" diameter striker with a velocity of 11.1 ft/s. Failure was classified as brittle if the film shattered or fractured into pieces; while a ductile failure was reported if a hole was created in the film.

Transmission Electron Microscopy: Thin cross sections were made on a Cryo-Ultramicrotome operated at −105° C. The sections were examined in a Philips CM12 TEM operated at 80 kV. The contrast was natural without the use of stains.

Optical Microscopy: Thin cross sections were made at −60 C and examined using a Zeiss light microscope

Example 1

Preparation of Nylon 6,6 Salt

A 5000-ml, three-necked flask was equipped with a stirrer and a dropping funnel. To the flask were added 1800 ml of ethanol and 182.7 grams (1.25 mole) of adipic acid and, with stirring and heating at about 65° C., a uniform solution was prepared. To the flask was then added 200 ml of deionized water. While the flask contents were being stirred at 60–65° C., a solution of 165 grams (1.42 mole) of 1,6-hexandiamine in 500 ml of ethanol was then added dropwise during about 20 minutes to produce a colorless solution. The reaction mixture was then allowed to cool to 25°–30° C. and a white solid precipitated. The reaction mixture was further cooled with water and ice to about 20° C. and filtered. The granular white product was washed with about 300 ml of chilled methanol and dried to obtain 239.5 grams of nylon 6,6 salt.

Example 2

Preparation of Nylon 6,6 Oligomer 50 grams of the nylon 6,6 salt from Example 1 were weighed into a 300-ml glass liner and placed in an unstirred Paar autoclave. The autoclave was then pressurized with nitrogen and bled to atmospheric pressure three times and heated during 42 minutes under autogenous pressure to 215° C. and held for 2 hours. The autoclave was allowed to cool to about 30° C.; the pressure was released to atmospheric; and the glass liner continuing the nylon 66 oligomer was removed from the autoclave. The nylon 6,6 oligomeric product was translucent and had an Ih. V. of 0.20. The yield was 48.6 grams.

Example 3

Preparation of Nylon 6,6 Polymer (Control)

50.0 grams of a nylon 6,6 oligomer, Ih. V of 0.54, prepared as described in Example 2 was placed in a 0.5 L polymerization reactor under a 1 atmosphere nitrogen atmosphere. The reactor was immersed in a metal bath at 280° C. After 30 minutes, the nylon 6,6 oligomer was mostly melted to give a transparent, yellow-tinted, and medium melt viscosity product. After an additional 15 minutes, the oligomer was completely melted. At this point, nitrogen flow was terminated and vacuum was applied. Within ten minutes, the pressure was reduced from ca. 1 atmosphere to 0.30 Torr. The polymer was stirred under vacuum (0.3 Torr) for 17 minutes, achieving a very high melt viscosity. The polymer was allowed to cool and ground. After grinding, some of the polymer was utilized to melt press polymer films that could be used for testing. The melt-pressed film was translucent and very tough. The Tm of the product was 264° C. and the Ih. V. was 1.75 dL/g.

Example 4

Emulsion

To a 2 L jacketed reaction kettle equipped with a condenser, nitrogen purge, and stirrer, 515.76 g of ethylene diol, 164.79 g of water and 12.28 g of Tergitol 15-S-40, a nonionic surfactant manufactured by Union Carbide (70% in water), were added. The contents of the reactor were heated to 85° C. In a separate 500 ml flask, a monomer/surfactant mix of 326.65 g 2-ethylhexylacrylate, 17.19 g of trimethylolpropane triacrylate, 103.15 g of ethylene diol and 7.37 g of Tergitol 15-S-40 was prepared. To the heated reactor, 45.44 g of the monomer/surfactant mix was added. After allowing the contents of the reactor to re-equilibrate, 0.69 g of sodium persulfate dissolved in 16.8 g of water was added to the reactor. After a few minutes, the reactor appearance changed from clear to a bluish white tint indicating the formation of small particles. The remaining monomer mix was fed into the reactor over a period of 90 minutes. At the same time the monomer was being added to the reactor, 1.72 g of sodium persulfate dissolved in 33.6 g of water was fed into the reactor. After all the monomer was added, the reaction was held at 85° C. for an additional hour at which point the reactor was cooled to room temperature.

The resulting latex was filtered through a 100 mesh screen. The dried scrap collected on the screen was 18.45 g. The effective diameter as measured by dynamic light scattering was 194 nm.

Example 5

Preparation of Nylon 6.6/EG Latex Blend

A sample of the nylon 6,6 oligomer of Ih. V. 0.20 from Example 2 (47.8 grams) and sodium acetate (0.029 grams (3.59×10-4 mole)) were placed in a 0.5 L polymerization reactor under a 1 atmosphere nitrogen atmosphere. The reactor was immersed in a metal bath at 230° C. and the temperature was immediately set to 280° C. After 25 minutes, the bath temperature had reached 280° C. and the nylon 6,6 oligomer was mostly melted to give a transparent, yellow-tinted, and low melt viscosity product. After being stirred an additional 3 minutes at 280° C., the product was completely melted and the melt was sampled for Ih. V. The Ih. V. of this sample was 0.79. At this point, 28.1 grams of the emulsion of Example 4 was slowly added via a 125-mL, pressure-equalizing funnel over a period of 25 minutes and heating was continued at 280° C. under an atmosphere of nitrogen for another 3 minutes. At this point, nitrogen flow was terminated and vacuum was applied. Within ten minutes, the pressure was reduced from ca. 1 atmosphere to 0.30 Torr. The polymer was stirred under vacuum (0.2–0.3 Torr) for 25 minutes, achieving a very high melt viscosity. The polymer was allowed to cool and ground. After grinding, some of the polymer was utilized to melt press polymer films that could be used for testing. The melt-pressed film was translucent and very tough. The Tg of the product was 42° C. and the Ih. V. was 1.74 dL/g. Particles up to 10 microns in size were dispersed in the nylon 6,6 blend (optical microscopy).

Example 6

Preparation of Water Latex

To a 1 L jacketed reaction kettle equipped with a condenser, nitrogen purge, and stirrer; 394.63 g of water and 2.31 g of Hitenol HS-20 were added. The contents of the reactor were heated to 65° C. In a separate 500 ml flask, a monomer/surfactant mix of 196.15 g butylacrylate, 23.08 g of styrene, 11.54 g of allyl methacrylate 58.85 g of water and 4.62 g of Hitenol HS-20 was prepared. To the heated reactor, 29.4 g of the monomer/surfactant mix was added. After allowing the contents of the reactor to re-equilibrate, 0.77 g of t-butyl hydroperoxide (t-BHP) dissolved in 11.2 g of distilled water was added to the reactor followed by 0.23 g Sodium Formaldehyde Sulfoxylate (SFS) dissolved in 11.2 g of distilled water. After a few minutes, the reactor appearance changed from clear to white with a bluish white tint indicating the formation of small particles. The remaining monomer mix was feed into the reactor over a period of 195 minutes. During the same time period, 0.92 g of SFS dissolved in 28 g of distilled water was feed into the reactor. Also, 0.51 g of 90 wt. % t-BHP dissolved in 56 g of water was feed into the reactor. After all the monomer was added the reaction was held at 65° C. for an additional one half hour at which point the reactor was cooled to room temperature.

The resulting emulsion was filtered through a 100 mesh screen. This emulsion contained 28.5% solids and the particle size was 63 nm as measured by dynamic light scattering.

Example 7

Preparation of Nylon 6,6/Water Latex Blend

A sample of nylon 6,6 oligomer of Ih. V. 0.54 prepared as in Example 2 (47.8 grams) was placed in a 0.5 L polymerization reactor under a 1 atmosphere nitrogen atmosphere. The reactor was immersed in a metal bath at 280° C. After 25 minutes, the nylon 6,6 oligomer was mostly melted to give a transparent, yellow-tinted, and medium melt viscosity product. After being stirred an additional 3 minutes at 280° C., the product was completely melted and the melt was sampled for Ih. V. The Ih. V. of this sample was 0.98 dL/g. At this point, 28.1 grams of the emulsion of Example 6 was slowly added via a 125-mL, pressure-equalizing funnel over a period of 80 minutes and heating was continued at 280–290° C. under an atmosphere of nitrogen for another 15 minutes. At this point, nitrogen flow was terminated and vacuum was applied. Within eight minutes, the pressure was reduced from ca. 1 atmosphere to 0.30 Torr. The polymer was stirred under vacuum (0.2–0.3 Torr) for 5 minutes, achieving a very high melt viscosity. The polymer was allowed to cool and ground. After grinding, some of the polymer was utilized to melt press polymer films that could be used for testing. The melt-pressed film was translucent and very tough. The Tm of the product was 263° C. and the Ih. V. was 1.71 dL/g. Particles up to 300 microns in size were dispersed in the nylon 6,6 blend (optical microscopy).

The invention has been described in detail with particular reference to preferred embodiments thereof, but it will be understood that variations and modifications can be effected without departing from the scope and spirit of the invention.

What is claimed is:

1. A method of making an amide polymer/first polymer blend comprising the steps of:
   a. preparing a polymer colloid system comprising a first polymer dispersed in a liquid continuous phase;
   b. introducing the polymer colloid system into an amide polymerization reaction medium prior to or during the reaction, wherein the reaction medium comprises 1) a diacid component and a diamine component, an oligomer of a diacid and a diamine component, or a mixture thereof; and
   c. polymerizing the components of b)1, thereby providing an amide polymer/first polymer blend.

2. The method of claim 1, wherein the polymer colloid system comprises a latex polymer composition.

3. The method of claim 1, wherein the continuous phase comprises water substantially in the absence of diol.

4. The method of claim 1, wherein the continuous phase comprises from about 30% to about 100% water.

5. The method of claim 1, wherein the continuous phase comprises from about 30% to about 100% diol.

6. The method of claim 1, wherein the continuous phase comprises water and a diol.

7. The method of claim 1, wherein the first polymer comprises a residue of a non-acid vinyl monomer of an acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, styrene, α-methyl styrene, glycidyl methacrylate, carbodiimide methacrylate, $C_1$–$C_{18}$ alkyl crotonates, di-n-butyl maleate, α or-β-vinyl naphthalene, di-octylmaleate, allyl methacrylate, di-allyl maleate, di-allyhnalonate, methyoxybutenyl methacrylate, isobomyl methacrylate, hydroxybutenyl methacrylate, hydroxyethyl (meth)acrylate, hydroxypropyl(meth)acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, butadiene, vinyl(meth) acrylates, isopropenyl(meth)acrylate, cycloaliphaticepoxy (meth)acrylates, ethylformamide, 4-vinyl-1,3-dioxolan-2-one, 2,2-dimethyl-4 vinyl-1,3-dioxolate, 3,4-di-acetoxy-1-butene, or a mixture thereof.

8. The method of claim 1, wherein the polymer colloid system comprises a crosslinking agent, wherein the crosslinking agent comprises a multifunctional unsaturated compound.

9. The method of claim 1, wherein the first polymer comprises latex polymer particles that are uncrosslinked.

10. The method of claim 1, wherein the polymer colloid system comprises a surfactant.

11. The method of claim 1, wherein the diacid comprises isophthalic acid, terephthalic acid, cyclohexanedicarboxylic acid, a 6 to 12 carbon aliphatic diacid, or a mixture thereof.

12. The method of claim 1, wherein the diamine comprises meta-xylylene diamine, para-xylylene diamine, 1,3-cyclohexane(bis)methylamine, 1,4-cyclohexane(bis) methylamine, a 6 to 12 carbon aliphatic diamine or lactam, a 4 to 12 carbon aliphatic diamine, or a mixture thereof.

13. The method of claim 1, wherein the amide-type polymer comprises a partially aromatic polyamide and wherein the partially aromatic polyamide comprises poly (m-xylylene adipamide), poly(hexamethylene isophthalamide), poly(hexamethylene adipamide-co-isophthalamide), poly(hexamethyline adipamide-co-terephthalamide), poly(hexamethylene isophthalamide-co-terephthalamide), or a mixture thereof.

14. The method of claim 1, wherein the amide polymer comprises an aliphatic polyamide and wherein the aliphatic polyamide comprises polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6), polydodecamethylene-sebacamide (nylon 12,8), or a mixture thereof.

15. The method of claim 1, wherein glass fibers are added to the amide polymerization reaction medium prior to or during the polymerization reaction.

16. The product made by the process of claim 1.

* * * * *